(12) United States Patent
Chang (10) Patent No.: US 8,171,552 B1
(45) Date of Patent: May 1, 2012

(54) SIMULTANEOUS EXECUTION OF MULTIPLE ANTI-VIRUS PROGRAMS

(75) Inventor: Penner Chang, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 997 days.

(21) Appl. No.: 11/353,328

(22) Filed: Feb. 14, 2006

(51) Int. Cl.
*G06F 21/00* (2006.01)
(52) U.S. Cl. ............... 726/24; 726/22; 726/23; 726/25; 713/187; 713/188; 709/223; 709/224; 709/225
(58) Field of Classification Search .......... 713/164–167, 713/187–188; 726/22–25, 27–30
See application file for complete search history.

(56) References Cited

U.S. PATENT DOCUMENTS

| | | | |
|---|---|---|---|
| 6,026,402 A * | 2/2000 | Vossen et al. ................ | 707/9 |
| 7,293,177 B2 * | 11/2007 | Lahti et al. ................ | 713/188 |
| 2001/0020245 A1 * | 9/2001 | Golds et al. ................ | 709/102 |
| 2002/0032766 A1 * | 3/2002 | Xu ................ | 709/223 |
| 2006/0101263 A1 * | 5/2006 | Costea et al. ................ | 713/164 |
| 2007/0101435 A1 * | 5/2007 | Konanka et al. ................ | 726/27 |
| 2009/0217379 A1 * | 8/2009 | Chang et al. ................ | 726/24 |

OTHER PUBLICATIONS

ASkola et al, Vulnerability Dependencies in Antivirus Software, Sep. 9, 2008, The second International Conference on Emerging Security Information, Systems and Technologies.*

* cited by examiner

*Primary Examiner* — Taghi Arani
*Assistant Examiner* — Josnel Jeudy
(74) *Attorney, Agent, or Firm* — Beyer Law Group LLP (57) ABSTRACT

An anti-virus program executes simultaneously with another anti-virus program by accessing a function (target) driver in the driver model directly instead of traversing each filter driver in the driver model as is conventionally done. The filter driver component of the anti-virus program avoids deadlock and infinite execution loops by bypassing filter drivers of other executing anti-virus programs and other filter drivers and going straight to the driver that will be performing the specific function, such as opening a file for scanning. This is done by having the filter driver component of the anti-virus program obtain directly the handle of the function driver that will perform the function needed by the anti-virus program and thereby avoiding the filter drivers of other programs, specifically other anti-virus programs, that can prevent completion of the required function.

16 Claims, 11 Drawing Sheets

SIMULTANEOUS EXECUTION OF MULTIPLE ANTI-VIRUS PROGRAMS

FIELD OF THE INVENTION

The present invention relates generally to computer software programs intended to address malicious software in computer systems. More specifically, the present invention relates to the execution on a single computer of multiple anti-virus programs.

BACKGROUND OF THE INVENTION

Presently, most malicious software such as computer viruses, worms, spyware, etc. can be prevented from doing harm on a computer by running one or more appropriate preventative programs, often referred to as anti-virus programs, on a computer.
Over the years as the online world has expanded and become more prevalent, many forms of malicious computer programs (collectively referred to as "malware") have become an increasing threat to computer and networking operations, user privacy, and has become, at a minimum, an inconvenience that users and organizations have to address more and more often.

To alleviate this growing concern and threat, many computers have two or more anti-virus programs that protect the computer against malware. For example, a user may have a program that protects against viruses and another that is specifically directed at detecting spyware. In many cases, a user may not be aware of what types or how many different anti-virus programs are running on the user's computer. They may have been installed over a period of several years as updates or new versions of programs were being released. Or users often install new anti-virus programs to address more sophisticated forms of malicious software without removing or de-installing previous or outdated anti-virus programs.

Operating system problems—such as deadlocks and freezes—can occur, however, when two or more anti-virus programs are triggered and executing simultaneously. An anti-virus program typically is activated to scan files, e.g., an e-mail attachment or a file downloaded via an FTP or HTTP protocols when they are opened. It is possible, for example, that one anti-virus program's scanning may cause another anti-virus program to scan and this later scanning may cause the original anti-virus program to scan again. This may lead to infinite loops in the operating system.

Thus, it would be desirable to have an anti-virus program that will prevent operating system and application execution failures, such as deadlocks that would otherwise occur when two or more anti-virus programs are executing on the same computer.

SUMMARY OF THE INVENTION

To achieve the foregoing, and in accordance with the purpose of the present invention, an anti-virus program capable of executing with other anti-virus programs on the same computer without causing deadlock or execution failure by bypassing filter drivers in a driver model and going directly to a target driver is described.

A method of preventing execution failure when executing two or more anti-virus programs on a computer includes, receiving at an anti-virus program a request to scan a file, the request coming from an upper filter driver of a driver model in the operating system. The anti-virus program sends a subsequent request back to the upper filter driver to open the file that it requested be scanned. The upper filter driver then sends the to open the file from the program directly to a driver capable of performing the task, instead of sending it to other filter drivers that lie between it and the driver performing the task, referred to as a function driver.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not perfect in that many groups overlap. For example, commercially available "anti-virus" software is designed to scan a computer for viruses and worms, as well as other malicious software. Of course, later developed software not currently known may also fall within the definition of malware.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another. Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). An example of a Trojan horse is a program called Gpcoder that encrypts documents, spreadsheets and database files on a user's computer. The program then leaves the user a message about how to obtain a program for $200 that would remove the encryption. A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

Spyware is a piece of software that collects and sends information (such as browsing patterns or credit card numbers) about users and the results of their computer activity without explicit notification. Spyware usually works and spreads like Trojan horses. The category of spyware may also include adware that a user deems undesirable. Sometimes the term spyware is used to refer to more traditional malicious software such as viruses and worms. A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. A dialer is a program that replaces the telephone number in a modem's dial-up connection with a long-distance number (often out of the country) in order to run up telephone charges on pay-per-dial numbers, or dials out at night to send key logger or other information to a hacker. Software known as URL injection software modifies a browser's behavior with respect to some or all domains. It modifies the URL submitted to the server to profit from a given scheme by the content provider of the given domain. This activity is often transparent to the user.

Another type of malicious software performs extortion on a vast scale, such as threatening to take down an Internet web site (such as a gambling web site) during time sensitive events. An attacker would attempt to shut down an Internet site by using thousands of so-called "zombie" or "robot" personal computers that have been secretly taken over by malicious software. These computers could be used to simultaneously deluge a web site with incoming messages that would paralyze the web site.

Methods and systems for preventing execution failure, such as deadlock, in an operating system when two or more anti-virus programs are executing simultaneously are described in the various figures. To describe how files are opened and manipulated in an operating system, it is useful to first explain a generic driver model of the operating system that enables, among many other functions, the opening of files in an operating system.

A typical driver model, such as the Windows Driver Model, is a layered structure where drivers execute in a vertical, top-to-bottom stack and where requests (e.g., to open a file) are routed or passed through all layered drivers. The driver model was introduced to increase the functionality and ease of writing drivers for an operating system. A layered driver referred to as a filter driver is a specific type of driver that sits above another driver and intercepts requests directed at the lower driver's objects (e.g., a function driver or a filter driver). A filter driver that is above a function driver is an upper filter driver and one below the function driver is a lower filter driver. Filter drivers are optional drivers that add value to or modify the behavior of an application or device and can service one or more applications or devices. An upper filter driver facilitates supporting an application or device that behaves in most respects like a generic application or device of its class but has some additional functionality. An upper filter driver can be used to intervene in the flow of input/output request packets (IRPs) to enable extra functionality. In the context of an anti-virus program, extra functionality can include scanning a document for malware.

As noted, driver models, including the Windows Driver Model, are layered, hierarchies wherein drivers communicate with each other using IRPs. The Windows Driver Model defines a unified driver model by standardizing requirements and reducing the amount of code application developers need to create. A layered filter driver handles user-mode requests, IRPs (constructed by the operating system), processing and passing each request from the highest-level driver to the lowest-level driver. For example, if an application issues a read request for a file stored on hard disk, an IOR is passed to the file system driver that would route it to the disk driver, asking it to read data from a certain location on the hard disk. Filter drivers can be added in between other drivers, for example, for the encryption/decryption purposes. It is also possible for an application or filter driver to bypass filter drivers below it by directly obtaining the handle of the function or target driver. As is known in the field of application programming, in a typical file system, a device object A created by "File System Driver" or an equivalent method is mounted to a device object B created by a disk driver. A structure referred to as "Volume Parameter Block" ("VPB") is the ligament or connector between the disk device object B and the mounted file system device object A. The VPB structure is documented in DDK. Application programmers commonly use DDK APIs "ZwOpenFile" and "ObReferenceObjectByHandle," a disk device to obtain disk device object B. Using the disk device object B, the VPB can be obtained. And through the VPB, the file system device object A can be obtained and this is the target device object of the file operation. DDK provides an API "GetReleatedDeviceObject" to get the device object from a file object (get by using "ZwOpenFile" and "ObReferenceObjectByHandle"). However, when the DDK obtains the device object A, it searches the filter drivers above it, and gets the upper most device object and returns it.

Figure 1:
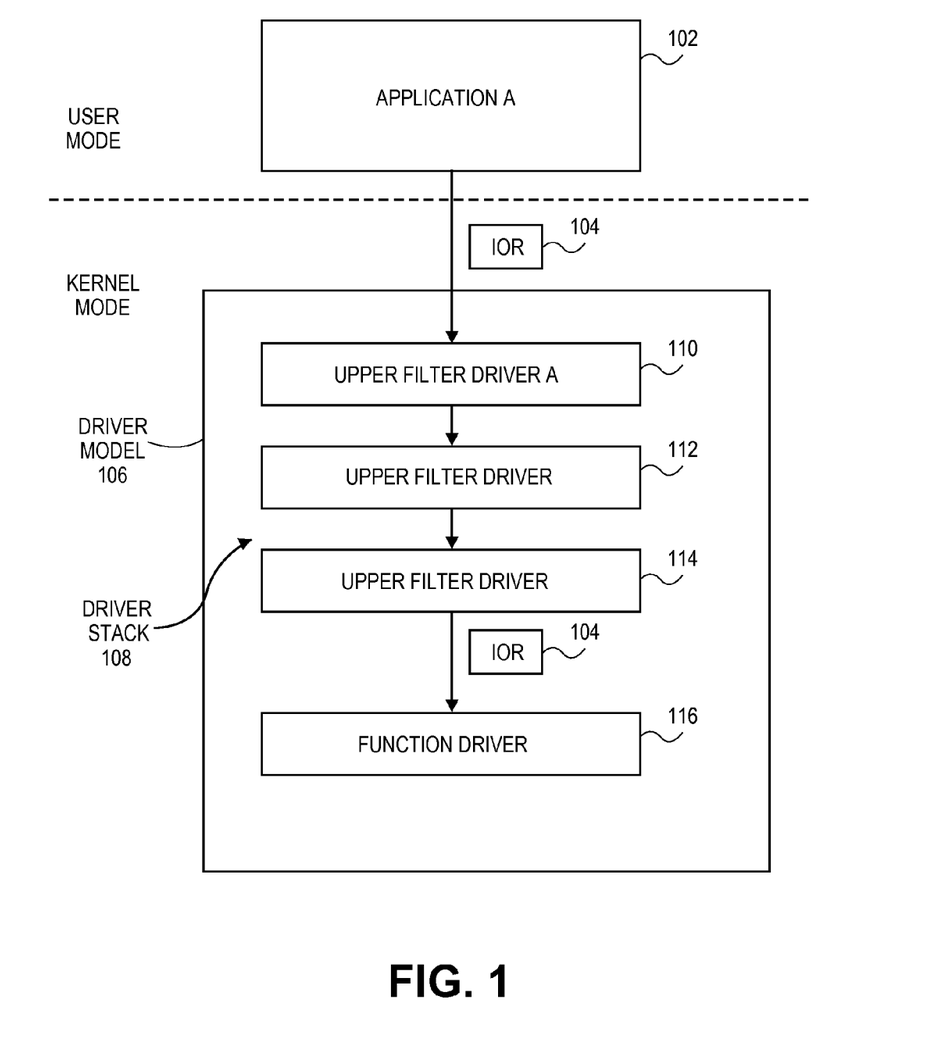
FIG. 1 is block diagram of a typical driver model.

FIG. 1 is block diagram of a typical driver model. An application A 102 in user mode, such as a Web browser or word processing program submits request or IRP 104 (created by the operating system to represent the I/O request) to open a file (not shown) a driver model 106. Driver model 106, operating in the kernel mode of the operating system, is comprised of a driver stack 108. IRP 104 goes to first upper filter driver A 110 that was installed by an application, the same application which installed filter driver A to monitor file operations, which is different from application A 102. One of the goals of driver model 106 is to route IRP 104 to a function or target driver which will perform the actual operation requested in IRP 104 (e.g., find the area on the hard disk that stores the bytes comprising the file). An upper filter driver, such as filter driver A 110, monitors the file operations of all applications, including application A 102. Filter driver A 110 can also be referred to as a "monitoring" driver.

When IRP 104 is accepted by driver model 106, filter driver A 110 accepts request 104 which passes the request to a subsequent upper filter driver 112 in driver stack 108. IRP 104 may be passed through further filter drivers, such as filter driver 114, in driver stack 108 before it reaches a function driver. The number of filter drivers an IRP passes through before it reaches a target or function driver depends on the operating system, the number of drivers in driver model 108, the type of request, and the originating application It is possible that an IRP goes directly to a function driver or from a first upper filter driver to a function driver. Once request 104 reaches function or target driver 116, the request for opening a file made by application A 102, is fulfilled. Passing an IRP through multiple filter drivers before the request reaches a function driver is a conventional process in most standard driver models in many operating systems. In the Windows operating system, the target driver for opening a file (and performing other file operations) is the File System Driver.

Figure 2:
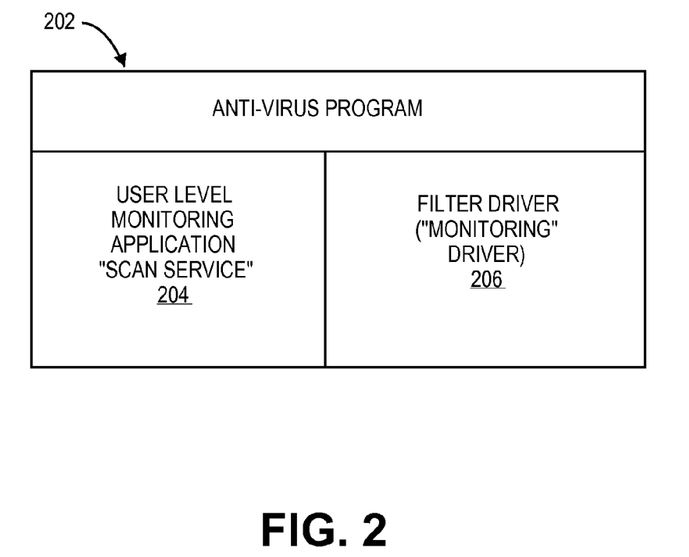
FIG. 2 is a block diagram showing two components or aspects of an anti-virus program.
Figure 3A:
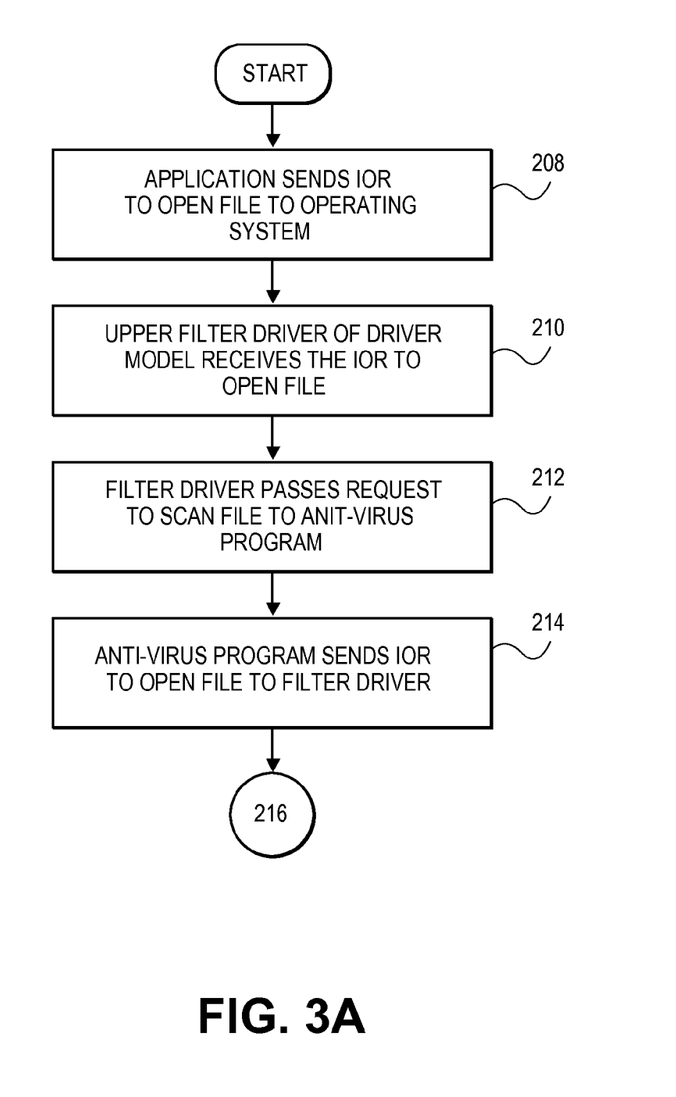
FIGS. 3A and 3B are flow diagrams of a process in which a single anti-virus program executing on a computer interacts with a user application and a driver model.
Figure 3B:
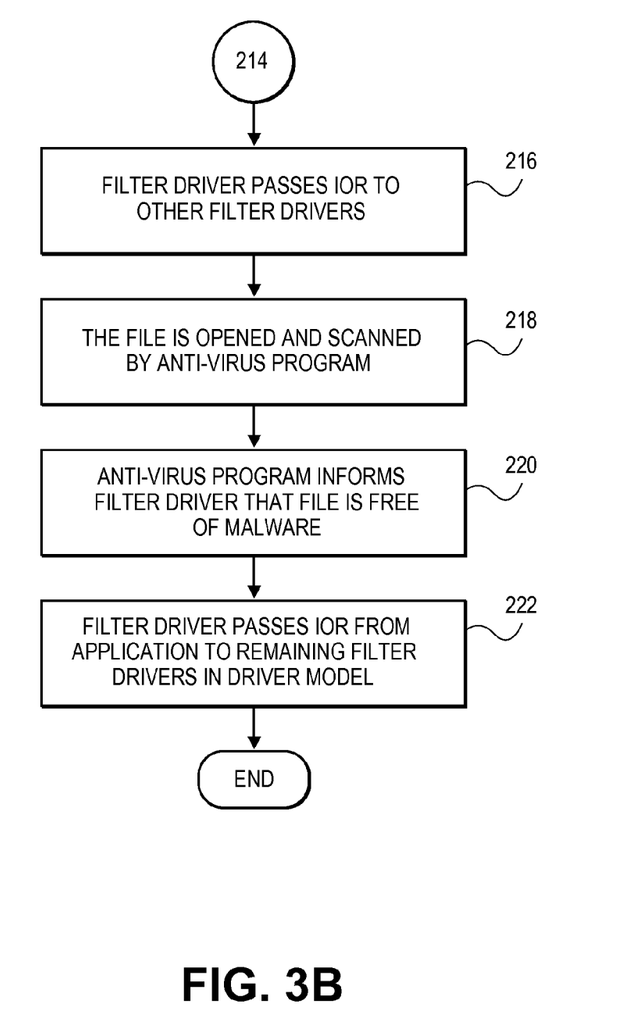

Processes in which a single anti-virus program executing on a computer interacts with a user application and a driver model are described in FIGS. 3A and 3B. FIG. 2 is a block diagram showing two components or aspects of an anti-virus program 202 in accordance with a preferred embodiment of the present invention. A component 204 is referred to as a user-level monitoring application 204. It is the component of anti-virus program 202 that performs the actual scanning of files for viruses and is also referred to as a "scan service" or "scan engine." Component 206 is a filter driver or monitoring driver component of anti-virus program 202. It is installed in driver model 106 as an upper filter driver and monitors all file operations requested by all applications, including anti-virus program 202.

In FIG. 3A, at step 208 an application. e.g., user.exe, sends an IRP to open a file, e.g., abc.txt, to the operating system. The request is directed to a driver model where at step 210 an upper filter driver A, the filter driver that co-executes with a user level monitoring component of the anti-virus program, receives the IRP to open abc.txt. At step 212 filter driver A notifies (via packet, event, or other methods) the user level monitoring component of an anti-virus program to have abc.txt scanned for malware. However, in order for the scan service to scan the file, the file must first be opened. This task must be implemented by the driver model. At step 214 the anti-virus program scan service sends an open abc.txt IRP to filter driver A. Because the request to open the abc.txt is from a scan service or engine of an anti-virus program, filter driver A passes the request to other filter drivers in driver stack 108 at step 216 of FIG. 3B This is possible because filter driver A passes the IRP to the next filter layer driver because the IRP is from filter driver A's own program (anti-virus program A). The IRP traverses the driver model until it reaches a function driver, for example, the Windows File System Driver. Thus, the anti-virus program is able to open the file without any obstacles. In the Windows operating system, there may or may not be additional upper filter drivers between filter driver A and the File System Driver.

At step 218 the file, abc.txt, is opened and scanned by the anti-virus program. For the purposes of illustrating a preferred embodiment of the present invention, we assume that the abc.txt has not been infected by any malware. At step 220 the anti-virus program informs filter driver A that abc.txt does not contain any malware. At step 222, filter driver A safely passes the original request to open the file from the application to subsequent drivers in the driver model. This completes a typical file opening and scanning process involving one anti-virus program executing on a computer. It is also possible that the file to be scanned is an executable file, such as bbb.exe, which goes through the same scanning process along with abc.txt as described in FIGS. 3A and 3B.

Figure 3C:
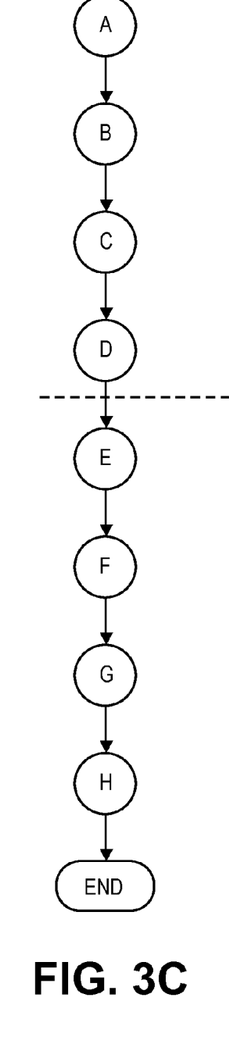
FIG. 3C is a simplified flow diagram of alphabetic identifiers that correspond to the steps in FIGS. 3A and 3B to facilitate comparison.

For the purpose of illustrating the present invention, steps in FIGS. 3A and 3B are assigned alphabetic identifiers and shown in a simplified flow diagram, FIG. 3C, to facilitate comparison with identical and similar steps shown in the flow diagrams below. In FIG. 3C: step 208 is A, step 210 is B, step 212 is C, step 214 is D, step 216 is E, step 218 is F, step 220 is G, and step 222 is H.

As shown in FIGS. 3A and 3B there is no opportunity for any type of deadlock or execution failure associated with multiple anti-virus programs when one anti-virus program is executing. However, when a second anti-virus program is executing concurrently with a first program and both are operating on the same file, execution failure can occur as shown in FIG. 3A.

Figure 4A:
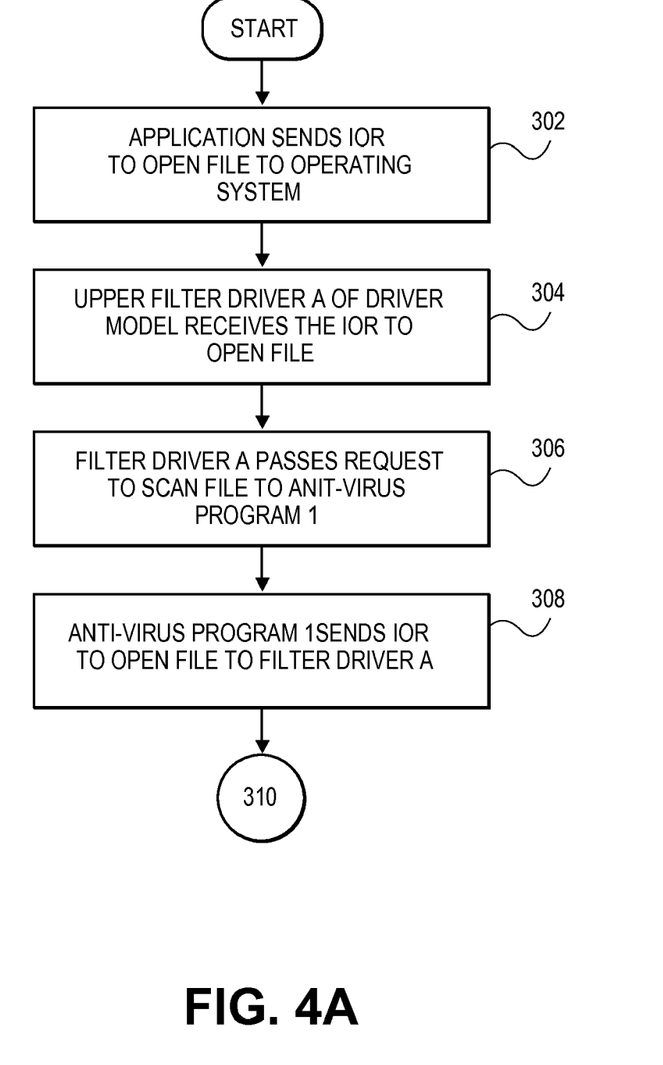
FIGS. 4A, 4B and 4C are flow diagrams of a process of opening a file and scanning the same file using one anti-virus program and having a second anti-virus program executing simultaneously.
Figure 4B:
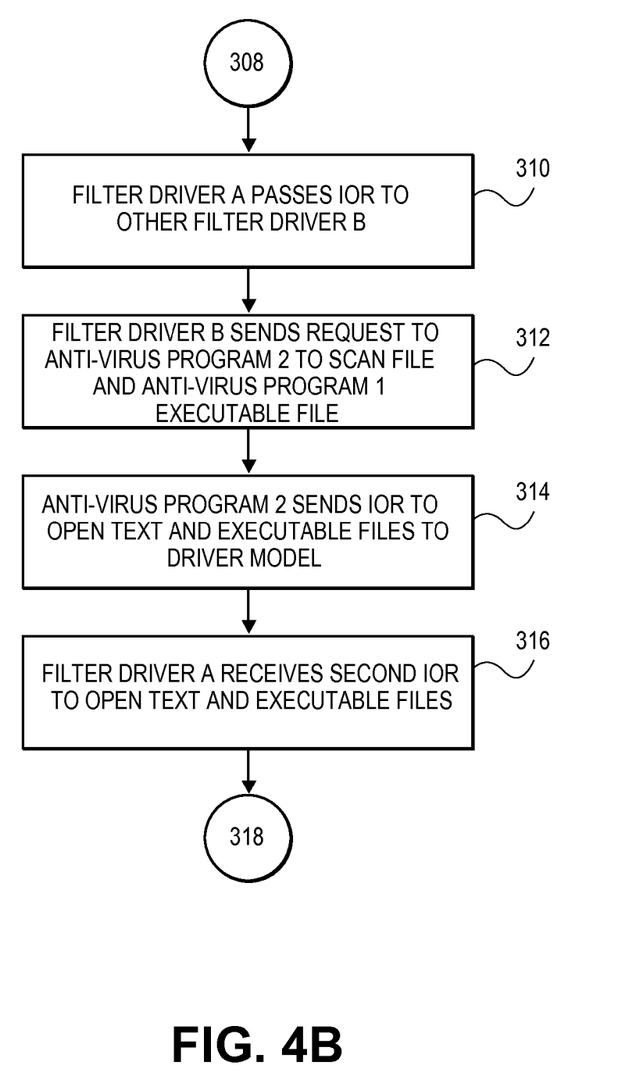
Figure 4C:
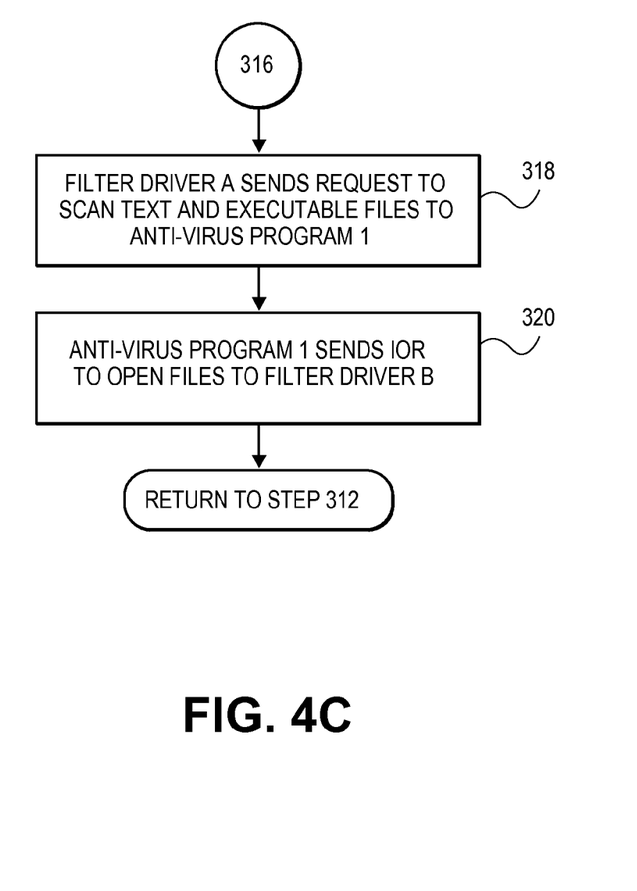
Figure 4D:
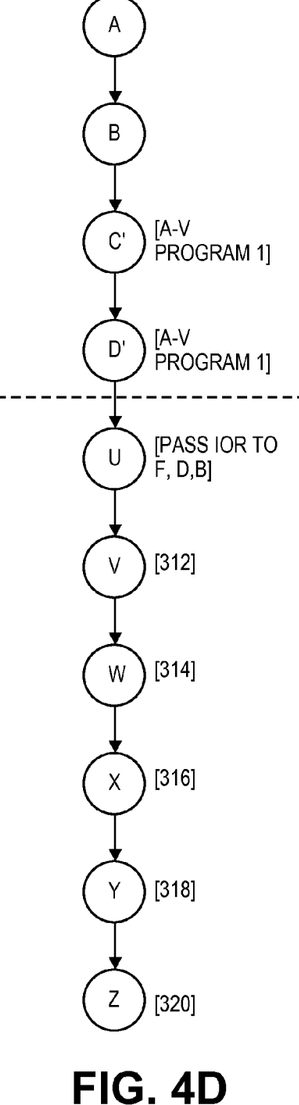
FIG. 4D is a simplified flow diagram of alphabetic identifiers that correspond to steps in flow diagrams of FIGS. 4A, 4B and 4C.

FIGS. 4A, 4B, and 4C are flow diagrams of a process of opening abc.txt and scanning the same file with anti-virus program 1 and anti-virus program 2 executing simultaneously to check for malware. To better illustrate how execution failures and deadlocks can occur, in addition to filter driver A and a function driver (e.g., Windows File System Driver), FIGS. 4A-C involves a second upper filter driver B. FIG. 4D is a flow diagram showing the alphabetic corresponding to steps in FIGS. 4A-C that are also present in FIGS. 3A and 3B and those that diverge.

At step 302 an application requests that a file, abc.txt, be opened. At step 304 filter driver A receives the IOR from the application to open the file. At step 306 file filter driver A determines that the file has to be scanned for malware and notifies (not an IRP) anti-virus program 1 to scan the file. At step 308 anti-virus program 1 sends a request to open file abc.txt for scanning to filter driver A. As shown in FIG. 4D, the steps described thus far are the same as those in FIGS. 3A and 3B except that steps C' and D' in FIG. 4D involves a first anti-virus program (indicated by ') whereas in FIG. 3C there was only one anti-virus program. FIG. 4D shows the letters corresponding to the steps in FIGS. 4A-C that are similar to those in FIGS. 3A and 3B and those that go beyond the completion of those figures where only one anti-virus program executes on the computer. A comparison between FIGS. 3C and 4D shows how the processes differ.

At step 310 filter driver A passes the IRP to open file abc.txt from anti-virus program 1 to upper filter driver B, the next filter driver in the driver stack as is conventional in driver model execution. At step 312 upon receiving the IRP, filter driver B sends a request to the user level monitoring component (scan service) of anti-virus program 2 to scan the file, abc.txt, as well as the executable file for anti-virus program 1 ("anti-virus1.exe") which is at this stage is coupled with the request to scan the abc.txt file. At step 314, anti-virus program 2, which now has to open abc.txt and anti-virus1.exe, sends a request to open these files to the driver model. The first upper filter driver to receive the IRP is filter driver A (at the top of the driver stack). It receives the request from anti-virus program 2 to open the file. However, filter driver A is required to once again send a scan request for file abc.txt and anti-virus2.exe to anti-virus program 1, along with a request to scan anti-virus1.exe.

At step 320 anti-virus program 1 makes a request to open the file abc.txt, this IRP is passed to filter driver B. Filter driver B in turn requests that anti-virus program 2 scan abc.txt and anti-virus1.exe as in step 312. This causes a deadlock or infinite loop which leads to an execution failure of the anti-virus programs and the operating system.

Figure 5A:
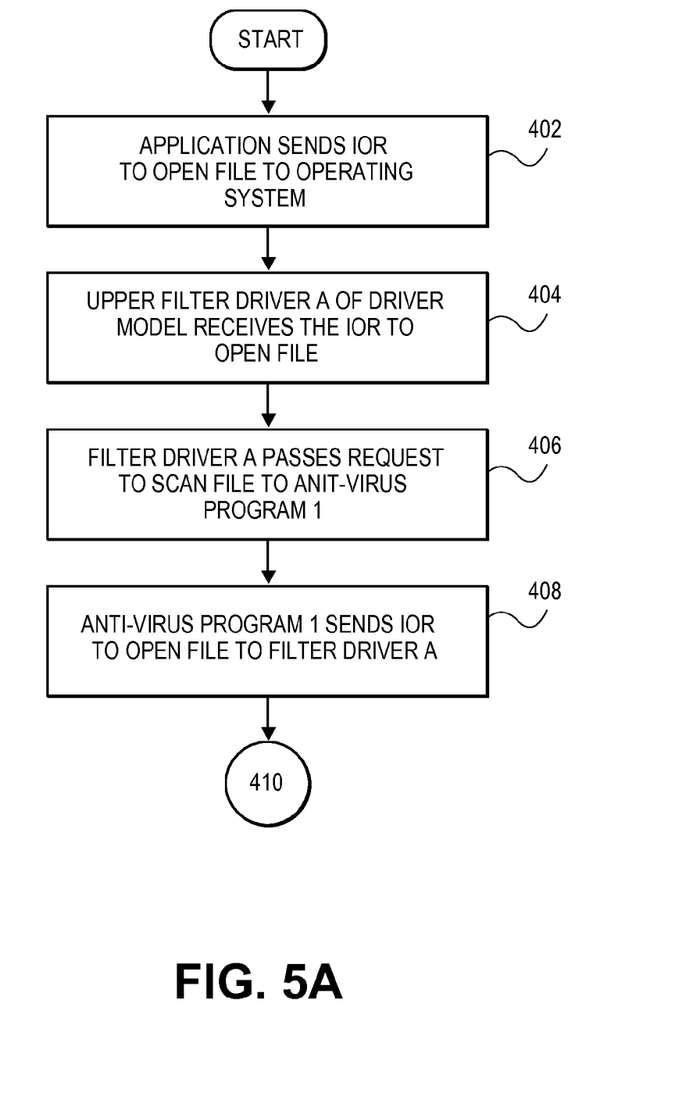
FIGS. 5A and 5B are flow diagrams of a process in which two anti-virus programs execute on the same computer without causing execution failures in accordance with one embodiment of the present invention.
Figure 5B:
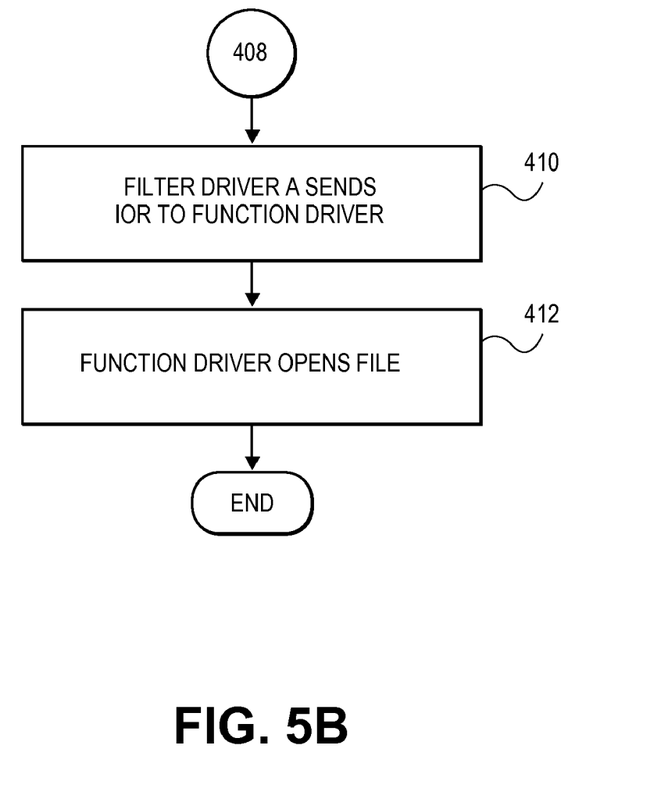

FIGS. 5A and 5B are flow diagrams of a process in which two anti-virus programs execute on the same computer without causing execution failures in accordance with one embodiment of the present invention. Steps 402 to 408 are the same as steps 302 to 308 of FIG. 4A, respectively. These steps end with anti-virus program 1 sending an IOR to open the file to filter driver A. This is shown graphically by comparing the first four circles in FIG. 4D (A, B, C', and D') with the first four circles in FIG. 5C.

At step 410 filter driver A sends the IOR for opening the file, abc.txt, directly to the function driver instead of passing it to filter driver B. Filter driver A is instructed to bypass filter driver B. First, the function driver device object is obtained. Following this, the IRP is sent to the function driver device object. The procedure for obtaining the function driver device object is the same as described above. It is possible that by bypassing filter driver B and other filter drivers, extra usage filter drivers, such as an encryption disk driver, is bypassed as well. In this case, the anti-virus program will not be able to read the content of the file and, thus, cannot determine if the file is infected. However, all other applications will read the file correctly. In any case, bypassing the filter drivers is done by enabling filter driver A to directly obtain a handle for the function driver, as described above. In a preferred embodiment, the anti-virus program of the present invention has a special procedure that allows it to directly obtain a handle for the function driver. The procedure follows the description provided above regarding the File System Driver, VPB, DDK, and related APIs. By bypassing filter driver B, anti-virus programs 1 and 2 can execute simultaneously without causing a deadlock or executing in an infinite loop. At step 412 the function driver opens abc.txt which can then be scanned by anti-virus program 1 and the process is complete.

Figure 5C:
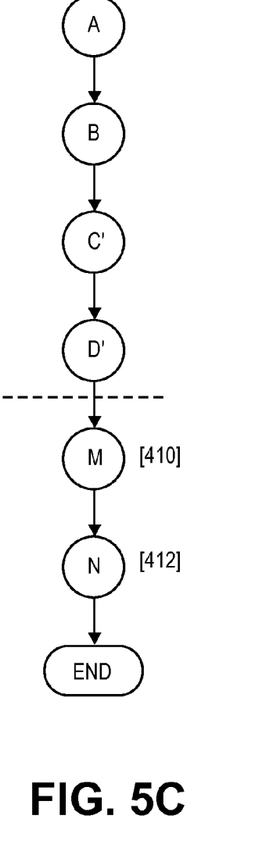
FIG. 5C is a simplified flow diagram of alphabetic identifiers that correspond to steps in the flow diagram of FIGS. 5A and 5B.

Thus, steps U through Z in FIG. 4D are replaced with steps M and N in FIG. 5C. Two or more anti-virus programs can execute without failure, such as an infinite loop as shown in FIG. 4D. Instead multiple anti-virus programs can execute as shown by steps M and N in FIG. 5C.

Computer System Embodiment

Figure 6A:
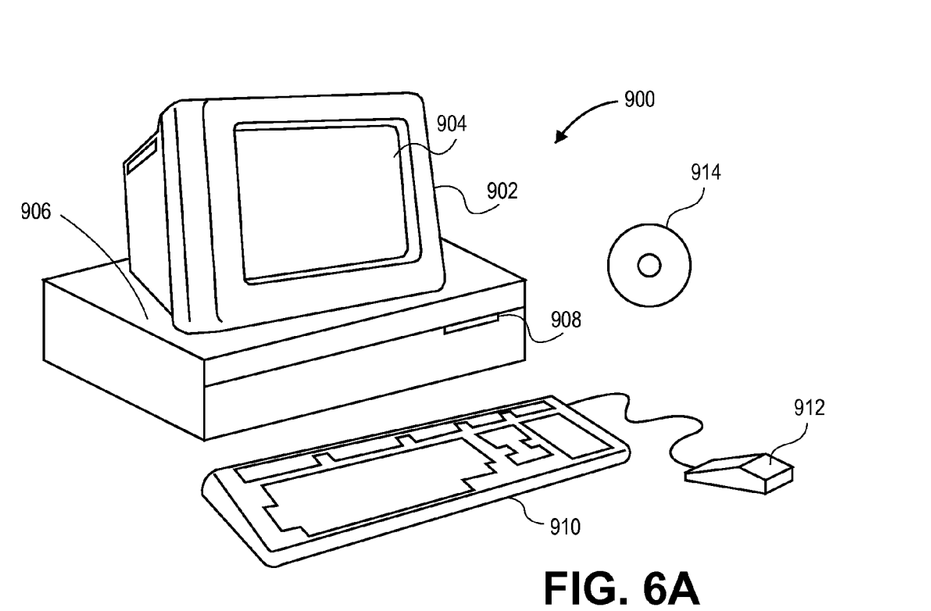
FIGS. 6A and 6B illustrate a computer system suitable for implementing embodiments of the present invention.
Figure 6B:
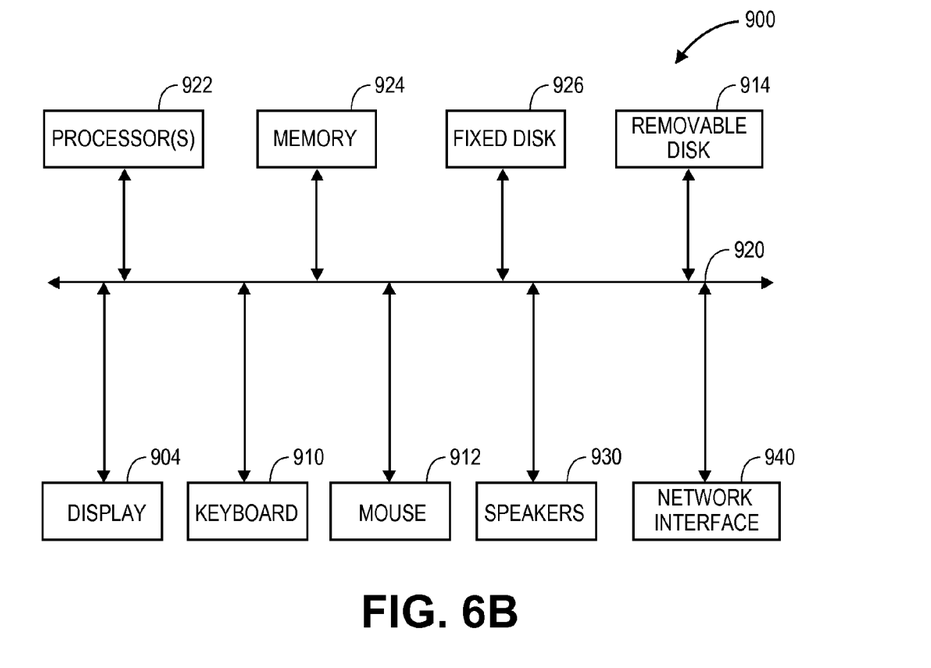

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of simultaneously executing a first anti-virus program and a second anti-virus program on a computer, the method comprising:
   receiving an open file request at a first filter driver in a driver stack from a software application to open a target file, said first filter driver associated with said first anti-virus program and designed to monitor file accesses for the first anti-virus program, wherein the driver stack is common to both the first anti-virus program and the second anti-virus program, wherein the driver stack is designed to pass requests through both the first filter driver and a second filter driver associated with the driver stack before the requests reach corresponding target drivers;
   causing the first filter driver to direct the first anti-virus program to scan the target file when the open file request to open the target file is received;
   sending a first request to said first filter driver from the first anti-virus program to open the target file;
   retrieving a handle of a function driver, said retrieving performed by the first anti-virus program, said function driver located in said driver stack;
   in order to prevent an infinite loop, bypassing the second filter driver in the driver stack, associated with the second anti-virus program, by having the first filter driver transmit a second request from the first filter driver directly to the function driver, wherein the first filter driver uses the handle of the function driver retrieved by said first anti-virus program to directly access the function driver, wherein the second filter driver is designed to monitor file accesses for the second anti-virus program;
   preventing the second filter driver from sending an instruction in response to the open file request to the second anti-virus program to scan the target file due to said bypassing; and
   opening the target file by the first anti-virus program for scanning using said function driver.

2. A method as recited in claim 1 wherein the first request from the software application is received by the first filter driver.

3. A method as recited in claim 1 wherein the first filter driver co-executes on a central processing unit (CPU) with a user-level monitoring application of the first anti-virus program.

4. A method as recited in claim 1 wherein the second filter driver associated with the second anti-virus program is adjacent to the first filter driver in the driver stack in the operating system of the computer.

5. A method as recited in claim 1 further comprising:
   the first filter driver directing a user-level monitoring application of the first anti-virus program to begin scanning.

6. A method as recited in claim 1 wherein the first request from the first anti-virus program to open the target file is received by the first filter driver.

7. A method as recited in claim 1 further comprising:
   creating an executable file associated with the first anti-virus program by invoking the user-level monitoring application of the first anti-virus program.

8. A method as recited in claim 7 further comprising:
   attaching said executable file with the target file, such that said direction to the second anti-virus program to scan includes scanning of the execution file.

9. A method as recited in claim 1 further comprising:
   transmitting the second request from the first filter driver directly to the function driver, thereby avoiding invocation of the second anti-virus program.

10. A method of preventing execution failure when executing two anti-virus programs on a computer, the method comprising:
    receiving, at a first anti-virus program, an instruction to scan a file from a first filter driver from a filter stack associated with the first anti-virus program, wherein the first filter driver is designed to monitor file accesses for the first anti-virus program, wherein the driver stack is common to both the first anti-virus program and the second anti-virus program, wherein the driver stack is designed to pass requests through both a first filter driver and a second filter driver associated with the driver stack before the requests reach corresponding target drivers;
    sending a file-open request from the first anti-virus program to the first filter driver to open the file;
    retrieving a handle of a function driver said retrieving performed by the first anti-virus program;
    the first filter driver in the driver stack directly sending a first request using the handle of the function driver to a target function driver in the driver stack capable of performing the first request;
    in order to prevent an infinite loop, bypassing the second filter driver in the driver stack, associated with the second anti-virus program by having the first filter driver transmit a second request from the first filter driver directly to the function driver, wherein the first filter driver uses the handle of the function driver retrieve by said first anti-virus program to directly access the function driver, wherein the second filter driver is designed to monitor file accesses for the second anti-virus program; and
    preventing the one or more filter drivers from sending instructions in response to file-open request to the one or more anti-virus programs to scan the file due to said bypassing.

11. A method as recited in claim 10 wherein the instruction to scan a file is received by the first anti-virus program.

12. A method as recited in claim 10 further comprising:
    opening the file by the target function driver; and
    scanning the file by the first anti-virus program.

13. A method as recited in claim 10 wherein the second request is forwarded directly to the target function driver by the first filter driver.

14. A method of detecting malware comprising:
    receiving, at a first filter driver in a driver stack common to multiple anti-virus programs, wherein the driver stack is designed to pass requests through both the first filter driver and a second filter driver associated with the driver stack before the requests reach corresponding target drivers, a file-open request to open a target file, said file-open request originating from an application, and said first filter driver associated with a first anti-virus program;
    sending an instruction from the first filter driver to a said first anti-virus program to scan the file;
    receiving a first request at the first filter driver to open the target file, said first request sent from the first anti-virus program;

retrieving a handle of a function driver to enable direct communication between the first filter driver and the function driver in a driver stack, said retrieving of the handle performed by the first anti-virus program;

in order to prevent an infinite loop, bypassing the second filter driver in the driver stack, associated with the second anti-virus program, by having the first filter driver transmit a second request from the first filter driver directly to the function driver, wherein the first filter driver uses the handle of the function driver retrieved by said first anti-virus program to directly access the function driver, wherein the second filter driver is designed to monitor file accesses for the second anti-virus program;

preventing the one or more filter drivers from sending instructions in response to the first request to the one or more anti-virus programs to scan the file due to said bypassing scanning the opened file for malware by said first anti-virus program.

15. A method as recited in claim 14 wherein the first anti-virus program has a user level monitoring component for scanning the file.

16. The method of claim 1, wherein the handle of the function driver is obtained through a volume parameter block.

\* \* \* \* \*